US011459221B2

(12) United States Patent
Levasseur et al.

(10) Patent No.: US 11,459,221 B2
(45) Date of Patent: Oct. 4, 2022

(54) ROBOT FOR STACKING ELEMENTS

(71) Applicant: AutoGuide, LLC, Chelmsford, MA (US)

(72) Inventors: David Levasseur, Chelmsford, MA (US); Justin Holwell, Chelmsford, MA (US)

(73) Assignee: AUTOGUIDE, LLC, Chelmsford, MA (US)

( * ) Notice: Subject to any disclaimer, the term of this patent is extended or adjusted under 35 U.S.C. 154(b) by 382 days.

(21) Appl. No.: 16/857,524

(22) Filed: Apr. 24, 2020

(65) Prior Publication Data

US 2021/0331905 A1 Oct. 28, 2021

(51) Int. Cl.
| | |
|---|---|
| *B65G 57/00* | (2006.01) |
| *B66F 9/06* | (2006.01) |
| *G05D 1/00* | (2006.01) |
| *G05D 1/02* | (2020.01) |
| *B66F 9/075* | (2006.01) |

(52) U.S. Cl.
CPC ............ *B66F 9/063* (2013.01); *B65G 57/00* (2013.01); *B66F 9/0755* (2013.01); *G05D 1/0088* (2013.01); *G05D 1/0274* (2013.01); *G05D 2201/0216* (2013.01)

(58) Field of Classification Search
CPC ........ B66F 9/063; B66F 9/0755; B65G 57/00; G05D 1/0088; G05D 1/0274; G05D 2201/0216
See application file for complete search history.

(56) References Cited

U.S. PATENT DOCUMENTS

| | | | |
|---|---|---|---|
| 6,952,488 B2 | 10/2005 | Kelly et al. | |
| 9,715,232 B1 | 7/2017 | Fischer et al. | |
| 10,007,266 B2 | 6/2018 | Fischer et al. | |
| 2018/0281178 A1 | 10/2018 | Jacobsen | |
| 2019/0333012 A1 | 10/2019 | Jacobus et al. | |
| 2019/0384314 A1 | 12/2019 | Jacobsen | |
| 2020/0004247 A1 | 1/2020 | Jacobsen et al. | |

(Continued)

FOREIGN PATENT DOCUMENTS

| | | |
|---|---|---|
| JP | 05-054496 U | 7/1993 |
| JP | 2015-084139 A | 4/2015 |

(Continued)

OTHER PUBLICATIONS

Written Opinion for International Application No. PCT/US2021/024877, dated Jul. 9, 2021 (5 pages).
International Search Report for International Application No. PCT/US2021/024877, dated Jul. 9, 2021 (3 pages).

(Continued)

*Primary Examiner* — Mathew Franklin Gordon
(74) *Attorney, Agent, or Firm* — Burns & Levinson LLP

(57) ABSTRACT

An example autonomous vehicle includes a body configured for movement along a surface and an end-effector to hold a first element having first and second features that mate to complementary third and fourth features on a second element. At least one of the end-effector or the body is controllable to move in at least four degrees of freedom. The autonomous device includes one or more sensors to detect the second element and to obtain information for locating the third and fourth features of the second element or other compatible device. The autonomous device also includes a control system to control at least one of the end-effector or the body to move in the at least four degrees of freedom to stack the first element on top of the second element.

22 Claims, 15 Drawing Sheets

(56) References Cited

U.S. PATENT DOCUMENTS

2020/0102147 A1 4/2020 Sullivan et al.
2020/0103882 A1 4/2020 Sullivan et al.

FOREIGN PATENT DOCUMENTS

WO 1987002484 A1 4/1987
WO 2018194765 A1 10/2018

OTHER PUBLICATIONS

U.S. Appl. No. 62/738,697, filed Sep. 28, 2018, (73 pages).
U.S. Appl. No. 62/738,800, filed Sep. 28, 2018, (62 pages).
Waheed, Imran. (Dec. 2006). "Trajectory / Temporal Planning of a Wheeled Mobile Robot" (Corpus ID No. 61900664) [Degree of Master of Science in the Department of Mechanical Engineering, University of Saskatchewan, Canada]. Semantic Scholar.org. (111 pages).
Navitrol Pallet Detection. Navitec Systems. Espoo, Finland. (May 2018). V. 1.2, (pp. 1-8). 8 pages.
Varga, Robert. (Robert). "Vision-based Autonomous Load Handling for Automated Guided Vehicles", 2014 IEEE 10th International Conference on Intelligent Computer Communication and Processing (ICCP), Cluj Napoca, Romania, Sep. 4-6, 2014. Technical University of Cluj Napoca, IEEE. (6 pages).
MIR Fleet Reference Guide. Mobile Industrial Robots A/S. Odense, SØ. (Jan. 2017). V. 1.0, (pp. 1-30). 32 pages.
MIR 500 User Guide. Mobile Industrial Robots A/S. Odense, SØ. (Sep. 2019). V. 1.3, (pp. 1-100). 100 pages.
MIR 100 User Guide. Mobile Industrial Robots A/S. Odense, SØ. (Nov. 2017). V. 1.0, (pp. 1-37). 39 pages.
MIR 100 User Guide. Mobile Industrial Robots A/S. Odense, SØ. (Aug. 2018). V. 1.1, (pp. 1-42). 44 pages.

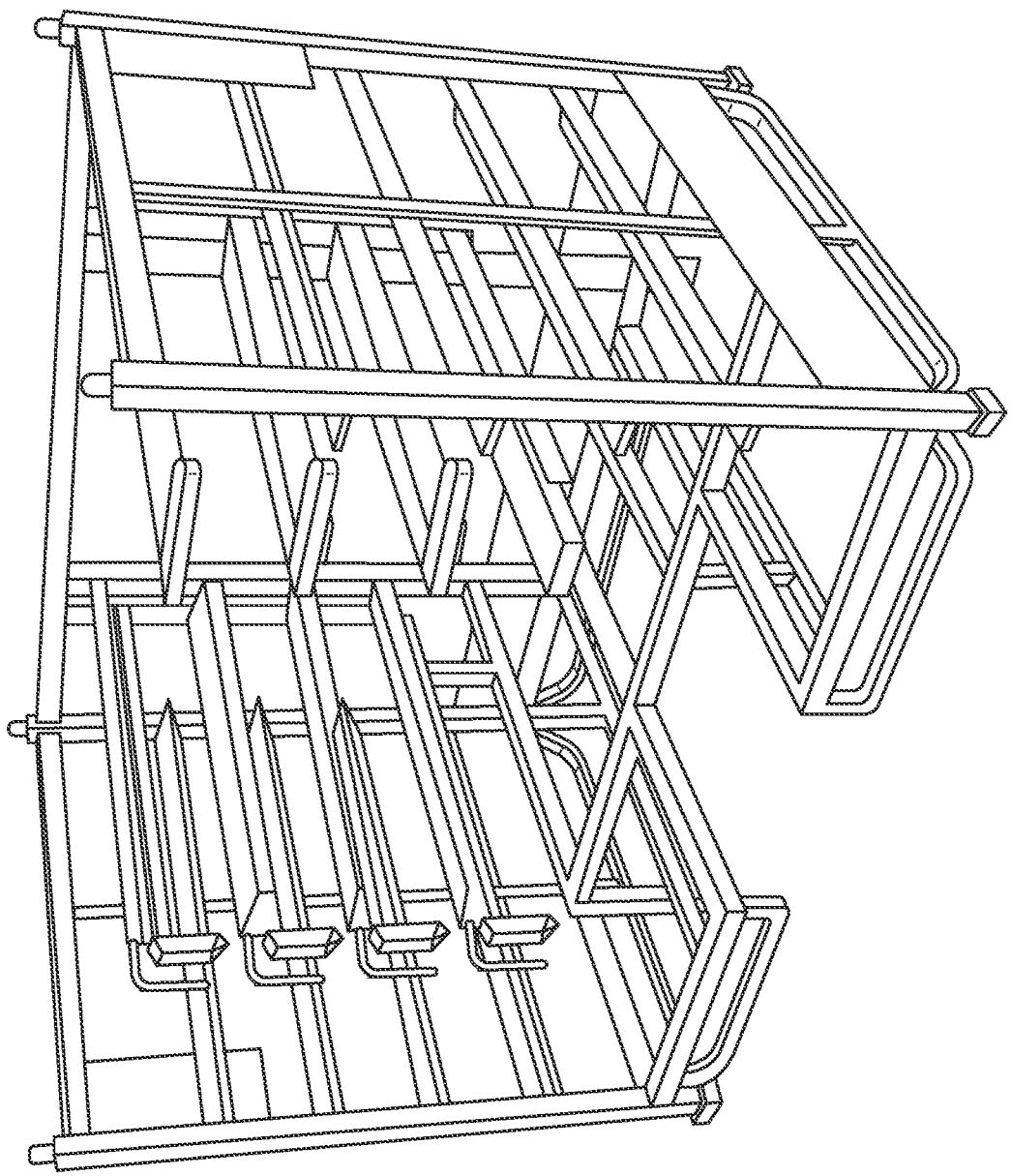
FIG. 9

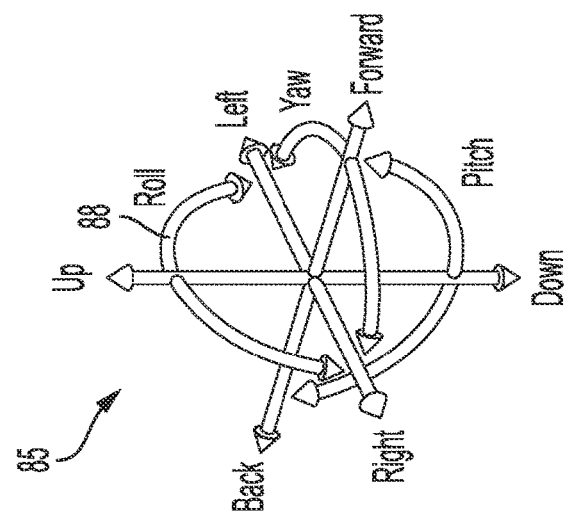
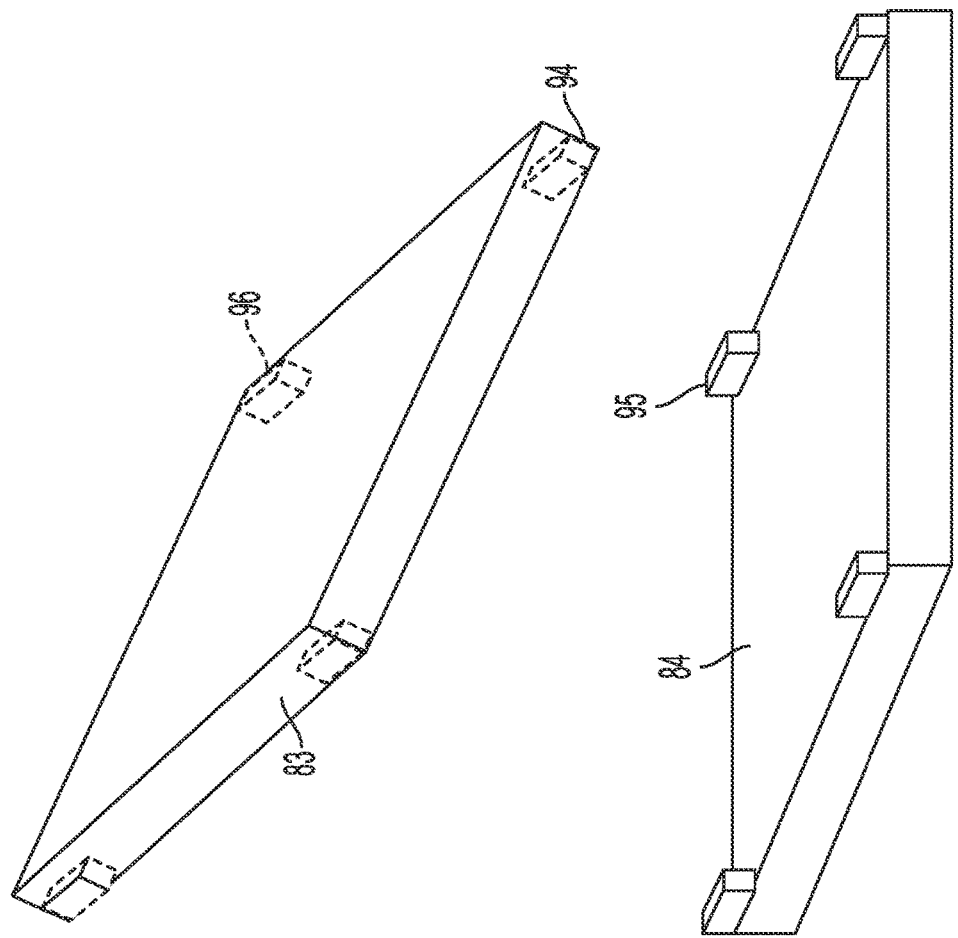
FIG. 11

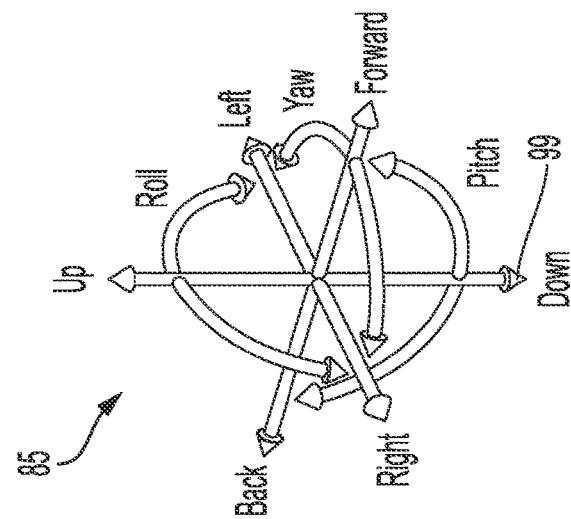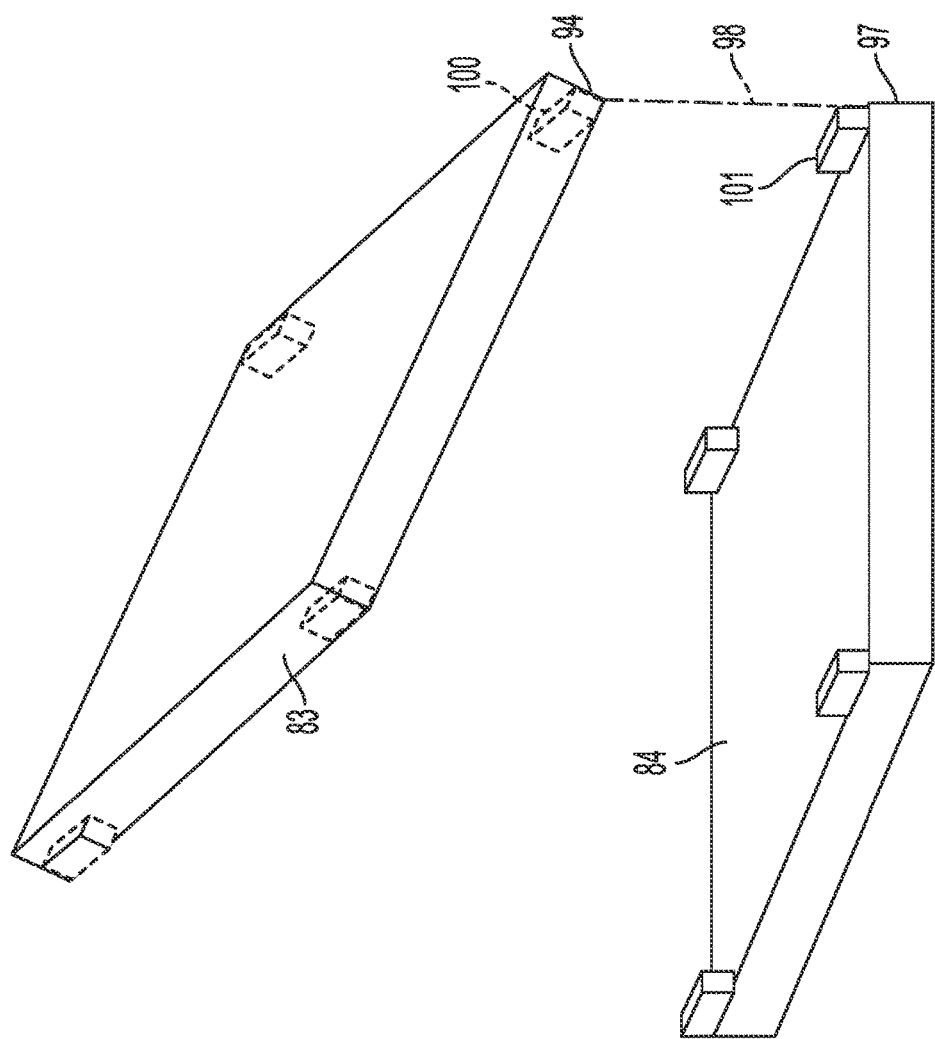
FIG. 12

ROBOT FOR STACKING ELEMENTS

TECHNICAL FIELD

This specification relates generally to examples of a mobile robot or a component thereof that is configured to move in multiple degrees of freedom to stack one element on top of another element.

BACKGROUND

Forklifts or other drivable machinery may be used to stack elements in a space, such as a warehouse or manufacturing facility. Examples of elements include pallets and containers. An example pallet includes a flat transport structure that supports goods during lifting. An example container includes a transportable structure having one or more vertical walls and having an inter-locking mechanism designed to prevent relative motion between the elements.

SUMMARY

An example autonomous vehicle includes a body configured for movement along a surface and an end-effector to hold a first element having first and second features that mate to complementary third and fourth features on a second element. At least one of the end-effector or the body is controllable to move in at least four degrees of freedom. The at least four degrees of freedom include forward/backward, up/down, left/right, and at least one of yaw, pitch, or roll. The autonomous device includes one or more sensors to detect the second element and to obtain information for locating the third and fourth features of the second element (or of another compatible device). The autonomous device also includes a control system to control at least one of the end-effector or the body to move in the at least four degrees of freedom to stack the first element on top of the second element by performing operations comprising: moving the first element to align the first feature to the third feature, moving the first element to align the second feature to the fourth feature, and moving the first element into contact with the second element so that the first feature mates to the third feature and the second feature mates to the fourth feature. The autonomous device may include one or more of the following features either alone or in combination.

The control system may be programmed to determine, based on the information, a first vector from the autonomous vehicle to the second element and a second vector from a sensor among the one or more sensors to the first element, and to control the at least one of the end-effector or the body to move based on a difference between the first vector and the second vector. The control system may be configured—for example, programmed—to move the first element in at least one of forward/backward, up/down, or left/right motions to align the first feature to the third feature. The control system may be configured to move the first element in at least one of pitch, yaw, or roll motions to align the second feature to the fourth feature. The control system may be configured to control the at least one of the end-effector or the body to move in at least five degrees of freedom, where the at least five degrees of freedom include: forward/backward, up/down, left/right, and at least two of yaw, pitch, or roll. The control system may be configured to control the at least one of the end-effector or the body to move in six degrees of freedom, where the six degrees of freedom include: forward/backward, up/down, left/right, pitch, yaw, and roll.

The one or more sensors may be configured to locate the third and fourth features in three-dimensional (3D) space. The one or more sensors may be configured to detect the second element in three-dimensional (3D) space and to obtain 3D coordinates for the second element. The one or more sensors may include one or more of the following: a light detection and ranging (LIDAR) sensor, a time-of-flight (TOF) sensor, a radar sensor, a sonar sensor, a two-dimensional camera sensor, or a three-dimensional camera sensor.

The control system may include one or more processing devices that are resident on the autonomous vehicle and that are configured execute software to perform the operations independent of data input from an external source. The one or more processing devices resident on the autonomous vehicle may be configured to execute software to perform the operations based, at least in part, on data input from a fleet system that is external to the autonomous vehicle. The one or more processing devices on the autonomous vehicle may be programmed to receive information from the fleet system and the one or more processing devices may be programmed to control movement of the body toward the second element based on the information. The one or more processing devices on the autonomous vehicle may be programmed to identify a type of the second element based on the information.

The autonomous vehicle may include computer memory storing a database containing data identifying different types of elements and attributes of the different types of elements. The control system may include one or more processing devices that are resident on the autonomous vehicle, and that are programmed to obtain data from the database to identify a type of the second element and attributes of the second element or compatible location. The attributes may relate to the third and fourth features of the second element. The one or more processing devices may be programmed to receive information from a fleet system that is external to the autonomous vehicle. The one or more processing devices may be programmed to move to a location proximate to the second element based on the information and, after reaching the location, to control at least one of the end-effector or the body to move in the at least four degrees of freedom to stack the first element on top of the second element independent of input from the fleet system. The received information may include a map of an area in which the second element is located.

The first element and the second element may each be or include compatible interlocking devices. The end-effector may be configured to move in the at least four degrees of freedom. The control system may be configured to control the end-effector to move in the at least four degrees of freedom to stack the first element on top of the second element. The end-effector may be configured to move in at least five degrees of freedom, where the at least five degrees of freedom include: forward/backward, up/down, left/right and at least one of pitch, yaw or roll. The control system may be configured to control the end-effector to move in the at least five degrees of freedom to stack the first element on top of the second element. The end-effector may be configured to move in six degrees of freedom, where the six degrees of freedom include: forward/backward, up/down, left/right, pitch, yaw, and roll. The control system may be configured to control the end-effector to move in the six degrees of freedom to stack the first element on top of the second element.

The end-effector may include tines to hold the first element. The tines may include a first tine and a second tine. The first tine may be configured to move independently of the second tine in at least one degree of freedom, and the second tine may be configured to move independently of the first tine in the at least one degree of freedom. At least one of the third feature or the fourth feature on the second element is or includes in a corner or a side or any other feature of the second element.

An example method performed by an autonomous vehicle includes the following operations: using an end-effector connected to a body of the autonomous vehicle to pick-up a first element having first and second features that mate to complementary third and fourth features on a second element; moving the autonomous vehicle holding the first element along a surface toward a location of the second element; detecting the second element, where detecting comprises locating the third and fourth features of the second element; and controlling at least one of the end-effector or the body to move in at least four degrees of freedom to stack the first element on top of the second element by performing operations comprising: moving the first element to align the first feature to the third feature, moving the first element to align the second feature to the fourth feature, and moving the first element into contact with the second element so that the first feature mates to the third feature and the second features mates to the fourth feature. The at least four degrees of freedom include forward/backward, up/down, left/right, and at least one of yaw, pitch, or roll.

Any two or more of the features described in this specification, including in this summary section, can be combined to form implementations not specifically described herein.

The example robots and techniques described herein, or portions thereof, can be implemented using, or controlled by, a computer program product that includes instructions that are stored on one or more non-transitory machine-readable storage media, and that are executable on one or more processing devices to control (e.g., coordinate) the operations described herein. The example robots and techniques described herein, or portions thereof, can be implemented as an apparatus or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF THE DRAWINGS

FIG. 9 is a diagram show a perspective view of an example rack that may be used for stacking elements.

FIGS. 10 to 15 are block diagrams that contain perspective views of elements and that illustrate the example element stacking process of FIG. 7.

Like reference numerals in different figures indicate like elements.

DETAILED DESCRIPTION

Figure 1:
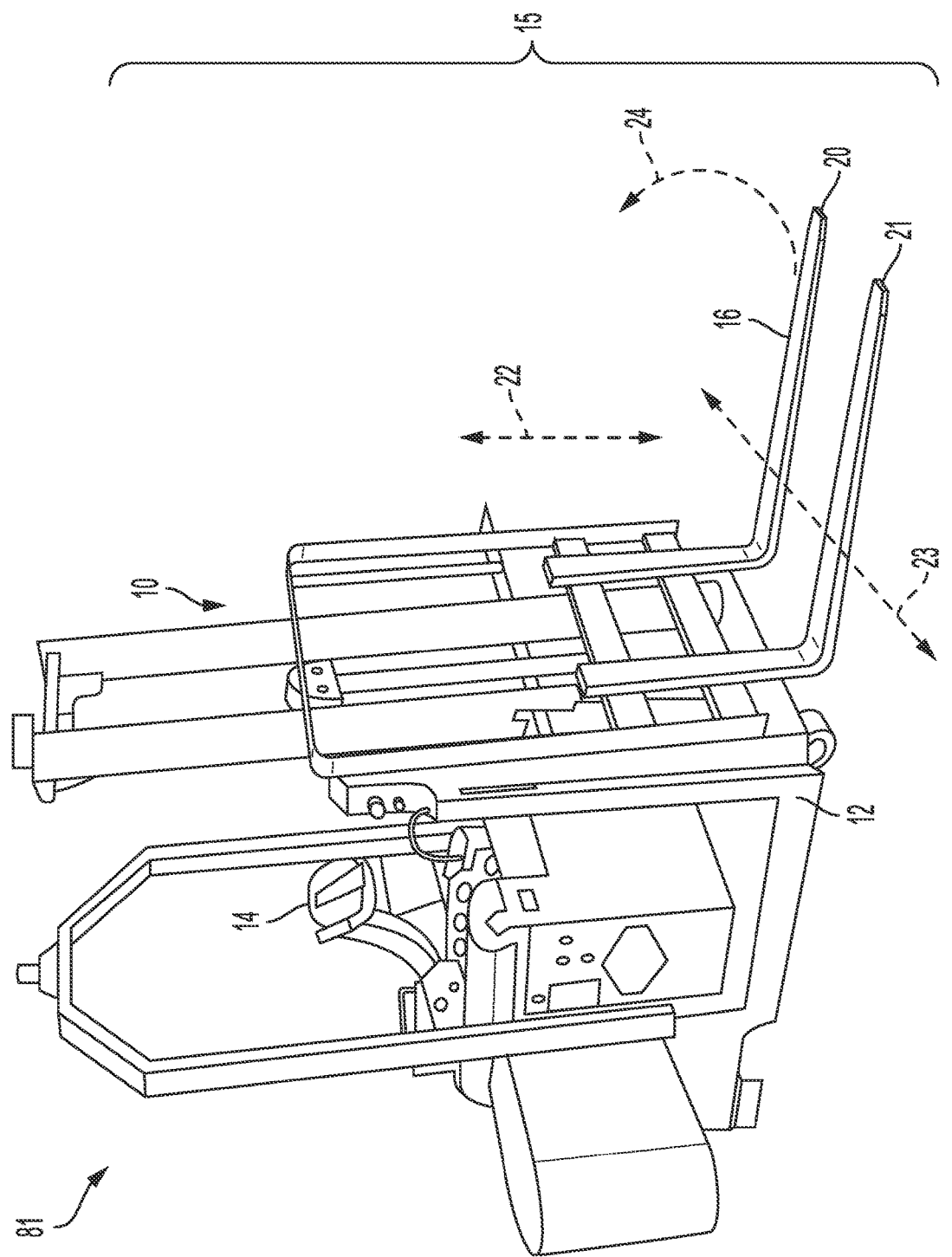
FIG. 1 is a photorealistic diagram showing a perspective view of an example autonomous vehicle.

Described herein are examples of autonomous vehicles configured to stack elements. Stacking may include placing one element on top of another element of the same or different type. The autonomous vehicles used as examples herein include mobile robots (or simply "robots"); however, any appropriate type of autonomous vehicle may be used including, but not limited to, self-driving machinery or stationary robots. The elements used as examples herein include pallets and containers; however, any appropriate types of elements may be used including, but not limited to, boxes, racks, crates, or bins. As noted, an example pallet includes a flat transport structure that supports goods during lifting. A pallet also includes a mechanism that the robot's end-effectors may enter and that are used to connect to, and to lift, the pallet. An example container includes a transportable structure having one or more vertical walls and having an inter-locking mechanism designed to prevent relative motion.

An example autonomous vehicle, such as a robot, includes a body configured for movement along a surface such as the floor of a warehouse. An end-effector, such as a fork containing one or more tines, is configured to hold a first element having features that mate to complementary or compatible features on a second element. A second element includes any type of device that is compatible with the first element. For example, a first or second element may include any appropriate type of compatible interlocking element. In an example, the end-effector is configured to hold a first element having first and second features that mate to complementary third and fourth feature on a second element located on the floor or in a rack. The end-effector, the body, or combination of the end-effector and the body are controllable to move in at least four degrees of freedom to move the first element relative to the second element. In an example, the at least four degrees of freedom include forward/backward, up/down, left/right, and at least one of yaw, pitch, or roll. One or more sensors, such as two-dimensional (2D) sensors and/or a three-dimensional (3D) sensor, are configured to detect the second element and to obtain information for locating the features—for example, the corners or alignment mechanisms—of the first and second element.

A control system, which may include one or more processing devices examples of which are described herein, is configured—for example programmed—to control the end-effector, the robot body, or both the end-effector and the robot body to move in the at least four degrees of freedom to stack the first element on top of the second element. Stacking may include aligning first, second, third, and fourth features of the elements. The operations executed to perform the stacking may include, but are not limited to, the following: moving the first element to align the first feature to the third feature, moving the first element to align the second feature to the fourth feature and, following these alignments, moving the first element into contact with the second element so that the first feature mates to the third feature and the second feature mates to the fourth feature. In an example where the elements are bins and the features are corners of the bins, the operations include moving the first bin to align a first corner of the bin to a third corner of the bin, moving the first bin to align a second corner of the bin to a fourth corner of the bin and, following these alignments, moving the first bin into contact with the second bin so that the first corner mates to the third corner and the second corner mates to the fourth corner. In some examples, each corner may include a component, such as a pin or an indentation, to which each alignment is made.

FIG. 1 shows an example of a robot 10 that is configured to move in at multiple degrees of freedom to stack one element on top of another element. In this example, robot 10 is autonomously-controllable even though it includes mechanisms 14 for manual control. In an example, autonomously-controllable includes the robot moving of its own accord based on sensor inputs and, in some cases, inputs from a remote system such as a fleet control system. Robot 10 includes a body 12 having wheels (not shown) to enable robot 10 to travel across a surface, such as the floor of a warehouse, a factory, or other terrain. Robot 10 also includes a support area 15 configured to support the weight of an element, such as a pallet, a container, or any other device to be stacked, using an end-effector 16. In this example, robot 10 may be controlled to transport the element from one location to another location.

As shown in FIG. 1, end-effector 16 includes a fork comprised of two tines 20, 21 in this example. Other types of end-effectors may be used, such as a plate or a gripper. The tines may be configured for vertical movement in the directions of arrow 22. This enables the tines to pick-up an element and to move the element to an appropriate vertical height for stacking. The tines also may be configured for horizontal movement in the directions of arrow 23. In some examples, the tines are interconnected and, therefore, move together. In some examples, each tine may be configured for independent and separate horizontal movement along the directions of arrow 23. That is, each tine may move relative to the other tine to adjust the distance between the two (or pitch). This adjustment may be necessary to accommodate elements having different socket locations. In some examples, each tine may be configured for independent and separate vertical movement along the directions of arrow 23. In some implementations, one of the tines may be movable out of the way to allow a single tine to interact with an element or other element. For example, a tine 20 may be rotatable by 90° in the direction of arc 24, leaving tine 21 in position to interact with an element or other element located in front of robot 10. The other tine 21 may operate similarly.

Figure 2:
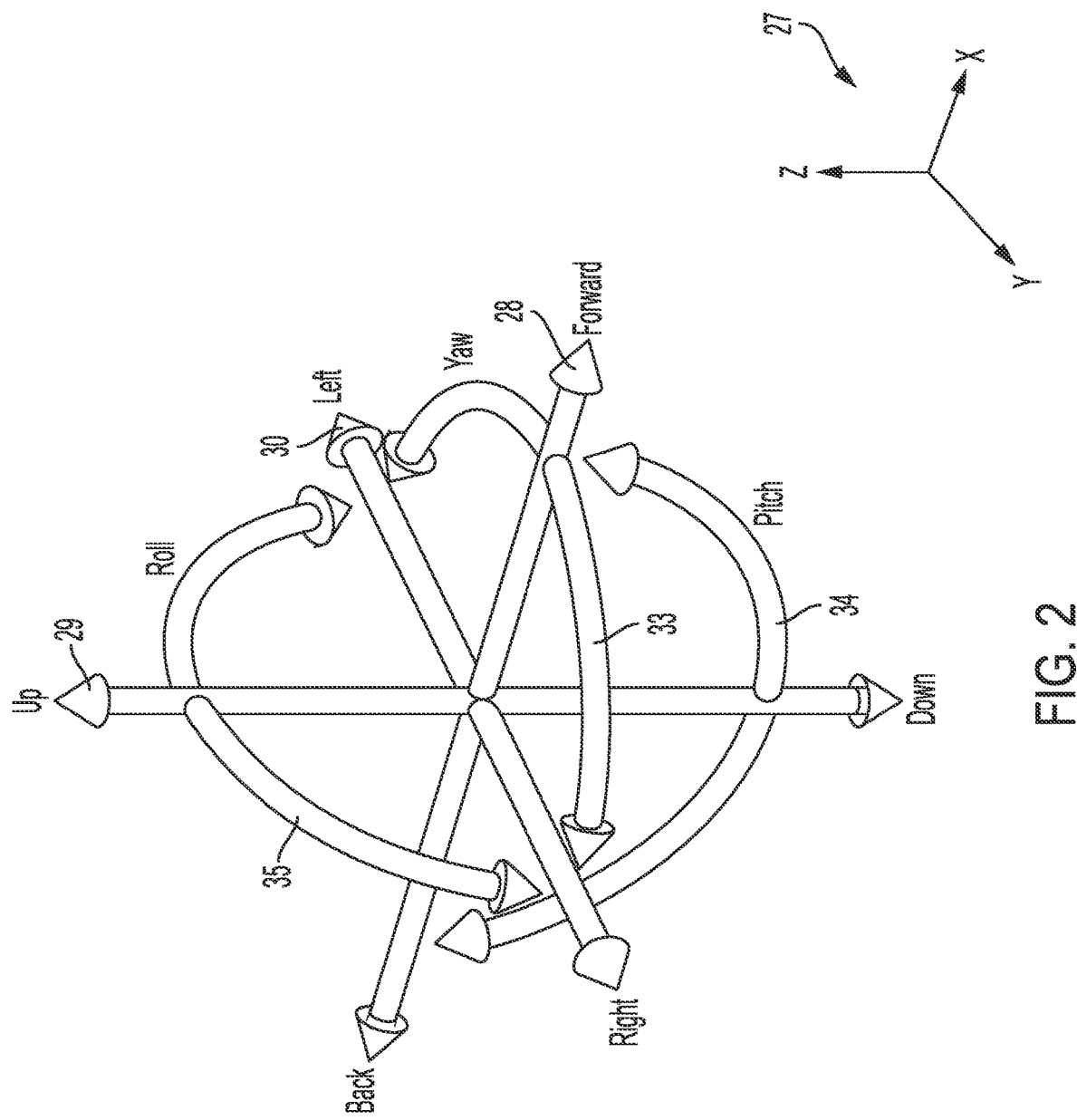
FIG. 2 is an illustration showing six degrees of freedom.

The end-effector, the robot body, or a combination of the end-effector and the robot body may move in four, five, or six degrees of freedom in order to move and to manipulate one element to stack that one element on top of another element. That is, the end-effector, the robot body, or a combination of the end-effector and the robot body may move in four, five, or six degrees of freedom in order to move and to manipulate one element to place that one element on top of another element of similar or different type. FIG. 2 shows movement in six degrees of freedom graphically relative to Cartesian X, Y, and Z axes 27. The six degrees of freedom include forward/backward (surge) 28, up/down (heave) 29, left/right (sway) 30, yaw 33, pitch 34, and roll 35.

In some implementations, the end-effector is controllable to move independently of the robot's body in at least four degrees of freedom which include forward/backward, up/down, left/right, and at least one of yaw, pitch, or roll. In some implementations, the end-effector is controllable to move independently of the robot's body in at least five degrees of freedom which include forward/backward, up/down, left/right, and at least two of yaw, pitch, or roll. In some implementations, the end-effector is controllable to move independently of the robot's body in six degrees of freedom which include forward/backward, up/down, left/right, yaw, pitch, and roll. These movements enable movement of the element in four, five, or six degrees of freedom.

In some implementations, the robot's body is controllable to move in at least four degrees of freedom which include forward/backward, up/down, left/right, and at least one of yaw, pitch, or roll. In some implementations, the robot's body is controllable to move in at least five degrees of freedom which include forward/backward, up/down, left/right, and at least two of yaw, pitch, or roll. In some implementations, the robot's body is controllable to move in six degrees of freedom which include forward/backward, up/down, left/right, yaw, pitch, and roll. These movements enable movement of the element in four, five, or six degrees of freedom.

Since the end-effector is connected to the robot's body, the end-effector may move along with the body. The end-effector may also be configured to make the above-described movements independently of the robot body. That is, the body may move in a number of degrees of freedom and the end-effector may move separately from the robot body in the same number of degrees of freedom, in fewer number of degrees of freedom, or in a greater number of degrees of freedom. For example, if the body moves forward, the end-effector may move forward along with the body but the end-effector may also move further forward or left/right independently of movement of the body.

In some implementations, the end-effector and the body are together controllable to move an element in at least four degrees of freedom which include forward/backward, up/down, left/right, and at least one of yaw, pitch, or roll. In some implementations, the end-effector and the body are together controllable to move an element in at least five degrees of freedom which include forward/backward, up/down, left/right, and at least two of yaw, pitch, or roll. In some implementations, the end-effector and the body are together controllable to move an element in six degrees of freedom which include forward/backward, up/down, left/right, yaw, pitch, and roll. For example, the body may be configured to move forward/backward and left/right and the end-effector may be configured to move up/down and at least one of yaw, pitch, or roll (four degrees), at least two of yaw, pitch, or roll (five degrees), or all of yaw, pitch, or roll (six degrees). Different combinations of movements than those described here may be implemented.

Figure 3:
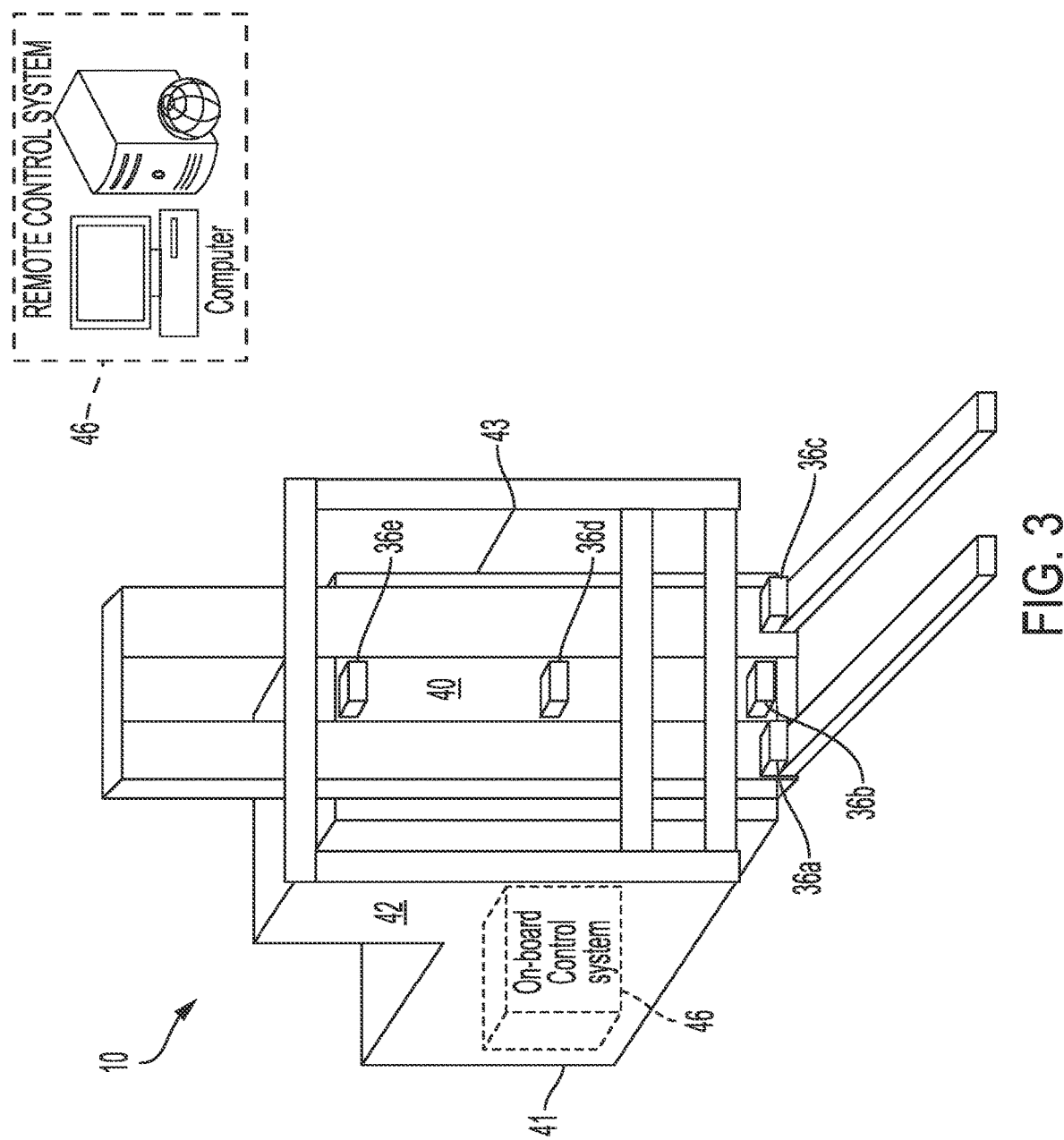
FIG. 3 is block diagram showing a perspective view of the autonomous vehicle of FIG. 1.

Referring also to the block diagram of FIG. 3, one or more sensors 36a, 36b, 36c, 36d, and 36e are located on robot 10 for use in detecting the location of the robot itself, for detecting an element to pick-up, and/or for detecting a location on which to place—for example, to stack—the element . The sensors are also usable to detect locations of alignment features on the elements and to track their location as the robot and/or the element moves relative to the stack. The sensors are configured to obtain 3D data at least from locations that are at least in front of the end-effector. Examples of sensors include 2D and 3D sensors. For example, robot 10 may include a 3D camera, a light detection and ranging (LIDAR) scanner, an optical sensor, a sonar sensor, a time-of-flight (TOF) sensor, a radar sensor, a 2D camera sensor, or any appropriate combination thereof. To obtain 3D data using 2D sensors, multiple 2D sensors may be used. Notably, the example robot is not limited to these types of sensors.

In an example, robot 10 includes a 3D camera at a front 40 of the robot. A 3D camera may capture, red, green, blue, and depth (RGBD) data. In this example, the front of the robot faces the direction of travel of the robot. In the example of FIG. 3, the front of the robot may include an arc spanning 180° or less from one side of the robot to the opposite side of the robot. In an example, robot 10 may include multiple LIDAR scanners at a front of the robot. Each LIDAR scanner is configured to detect objects within a sensing plane. Two or more LIDAR scanners may be configured and arranged to obtain 2D data in orthogonal sensing planes. This 2D data, when appropriately correlated and/or combined constitutes 3D information obtained from the front of the robot. Combinations of these and/or other sensors may be used to obtain 3D data representing the space in front of the robot. The 3D data may include 3D (e.g., Cartesian XYZ) coordinates representing the space.

In implementations that include multiple sensors on the front of the robot, the sensors may be located at different positions, for example at different heights. In addition, one or more the sensors may be movable on the robot. In some examples, sensors 36a, 36c may be located on, and movable with, the end-effector. A sensor located here enables the robot to detect and to image elements, such as a pallet or container, that are located directly in front of the end-effector. Data from such sensors enables the end-effector to identify sockets in the element and, therefore, facilitates entry of the end-effector into the sockets in the element. In some examples, one or more sensors may be located on the body of the robot. For example, one or more sensors 36d may be located at a mid-point of the robot, one or more sensors 36b may be located at a bottom of the robot, and/or one or more sensors 36e may be located at a top of the robot. Sensors strategically placed at these or other locations enable the robot to capture images of elements in front of the robot even when the robot is holding an element that blocks a sensor. Example elements include, but are not limited to, the following, a rack, a pallet, a fixed or movable device including a compatible interlocking mechanism, a stack of one or more elements, or a rack containing a stack of one or more element. For example, with proper placement, if one sensor is blocked—for example, by one or more element s on the end-effector, another sensor will not be blocked by those element s enabling for continuous sensing. Data captured by the sensors is sent the robot's control systems for processing and use.

In some implementations, robot 10 may include additional sensors at locations other than the front of the robot. For example, sensors of the type described herein may be included on one or both sides of the robot and/or on the back of the robot. In this example, the back of the robot is the opposite side of the front of the robot. In the example of FIG. 3, the back 41 of the robot includes an arc spanning 180° or less from one side of the robot to the opposite side of the robot. In the example of FIG. 3, the sides 42, 43 of the robot may include an arc spanning 180° or less from the direction of travel of the robot to the direction opposite to the direction of travel of the robot. These sensors may assist in operations such as object detection and localization.

LIDAR scanners, 3D cameras, and/or any sensors constitute a vision system for the robot. Visual data obtained by the vision system may be used to determine a location of the robot within a space being traversed. In this regard, in some implementations, a control system 46 stores a map of the space to be traversed in computer memory. Components of control system 46 are shown in dashed lines in FIG. 3 because at least part of the control system may be internal to the robot. The map may be located on the robot or at any location that is accessible to the control system. The map may include locations of landmarks, such as columns, corners, windows, poles, and other distinguishable features of the space that act as references for the robot. The map may include dimensions and distinguishing characteristics, such as color, shape, texture, and so forth of landmarks, such as columns, corners, windows, poles, and other distinguishable features of the space that act as references for the robot. The map may also include measurements indicating the size of the space, measurements indicating the size and locations of the landmarks, measurements indicating distances between landmarks, and coordinate information identifying where the landmarks are located in the space. The control system uses information in the map to move throughout the space and uses visual data from the vision system and data from the map to determine a location of the robot within the space. For example, the robot may identify the locations of three landmarks within the space. By knowing where the robot is relative to these landmarks, the locations of the landmarks on the map and thus within the space, and the distances between the landmarks, the control system can determine the location of the robot within the space. This information may be used to locate an element to pick-up or to locate another element on which to place —for example, to stack— the element the robot is holding or will hold. Examples of other elements include an element of like type, a compatible interlocking compatible device such as another element of like or different type, or a rack.

In some implementations, an on-board control system on the robot may use a pre-planned route through the map to identify where to locate an element to pick-up or to locate one or more of the following other elements on which to place the element the robot is holding: a stack of elements, a compatible interlocking device, or a rack. In some implementations, an on-board control system on the robot may not use a pre-planned route through the map to identify where to locate an element to pick-up or to locate one of the other elements on which to place the element the robot is holding. In this latter example, the robot may move through and around the space and, upon detecting an object, attempt to identify an element that the robot is controlled to move. As explained herein, identification may be performed by referencing a database containing attributes of elements. After the robot identifies an element of interest, the robot may the move through and around the space to identify one of the other elements on which to place the element that the robot is holding. The location of the other element may be pre-programmed or the robot may search through the space using its sensor systems to identify the other element. In this regard, in some implementations, the element or the other element on which to place the element the robot is holding may contain indicia such as a bar code, a QR code, or a serial number. The robot may identify such indicia on the element and other element, compare the identified indicia and, when a match is detected, determine that the element is to be placed on the other element. In some implementations, these operations may be performed based on dimensions of the element and the other element, or other distinguishing characteristics —such as color or markings—on the element and the other element.

Control system 46 may include circuitry or an on-board computing system to control operations of the robot. The circuitry or on-board computing system is "on-board" in the sense that it is located on the robot itself. The control system may include, for example, one or more microcontrollers, one or more microprocessors, programmable logic such as a field-programmable gate array (FPGA), one or more application-specific integrated circuits (ASICs), solid state circuitry, or any appropriate combination of two or more of these types of processing devices. In some implementations, on-board components of the control system may communicate with a remote computing system. This computing system is remote in the sense that it is not located on the robot itself. For example, the control system can also include computing resources distributed to a remote—for example, a centralized or cloud—service at least a portion of which is not on-board the robot. Commands provide by the remote computing system may be transferred for execution by an on-board computing system. In some implementations, the control system includes only on-board components. In some implementations, the control system includes a combination of on-board components and the remote computing system. In some implementations, the control system may be configured—for example programmed—to implement control functions and robot movement absent either local or remote input from a user. In some implementations, the control system may be configured to implement control functions, including localization, based at least in part on input from a user.

In some implementations, the remote control system may include a fleet control system. The fleet control system may include one or computing devices that operate together to control, to influence, or to instruct multiple robots of the type described herein. For example, the fleet control system may be configured to coordinate operations of multiple robots, including instructing movement of a robot to a position where an element is located and to a position where the element is to be stacked (for example, placed). In some implementations, the fleet control system may store, maintain, and update the map of the space in which the robot or robots are to operate. The map may be accessed by each robot through the fleet control system or the map may be downloaded periodically, intermittently, or sporadically to all or some robots operating in the space. The map may then be used to identify where an element is located and where the element is to be stacked. For example, the robot may use the map to position itself proximate to an element in order to pick-up the element; the robot may use the map to navigate towards another element on which the robot is to place the element that the robot has picked-up; and the robot may use the map to position itself proximate to the other element on which the robot is to place the element that the robot has picked-up. In this example, positioning may include moving robot so that its end-effector aligns to sockets in the element that is to be picked-up, which may include moving the body, the end-effector, or both.

In some implementations, the control system, including the remote portions thereof, may be distributed among multiple robots operating in the space. For example, one of the robots may receive the map—for example, from a fleet controller—and distribute the map to robots operating locally within the space. Similarly, one or more robots within the space may send command and control signals to other robots.

The control system, whether on-board the robot, remote from the robot, or a combination of on-board and remote, may include computer memory storing a database containing data identifying different types of elements and attributes of the different types of elements. For example, the database may include attributes identifying the make of an element, the model of an element, the number of sockets in an element, the dimensions of an element including length, width, and depth (XYZ), the material of which the element is made, the weight of the element, the element interface (or stacking) features, indicia or markings on the elements such as color, serial number, bar codes, QR codes, and the like, and any other appropriate information that the robot may need to pick-up the element, to move the element, and to stack the element on a rack or compatible interlocking device such as another element. This information may be usable by the robot to identify the element and to control its body and/or its end-effector to pick-up and to move the element. For example, an on-board control system on the robot may obtain information from a local or remote database of this type and may use that information to recognize the element and to stack the element as described herein.

Figure 4:
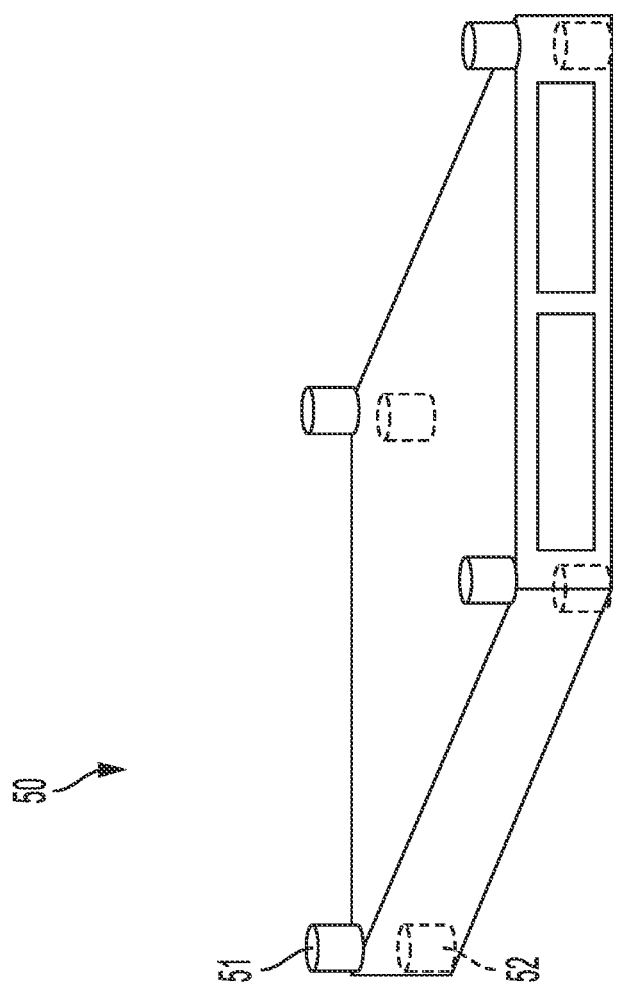
FIG. 4 is a block diagram showing a perspective view of an example element.
Figure 5:
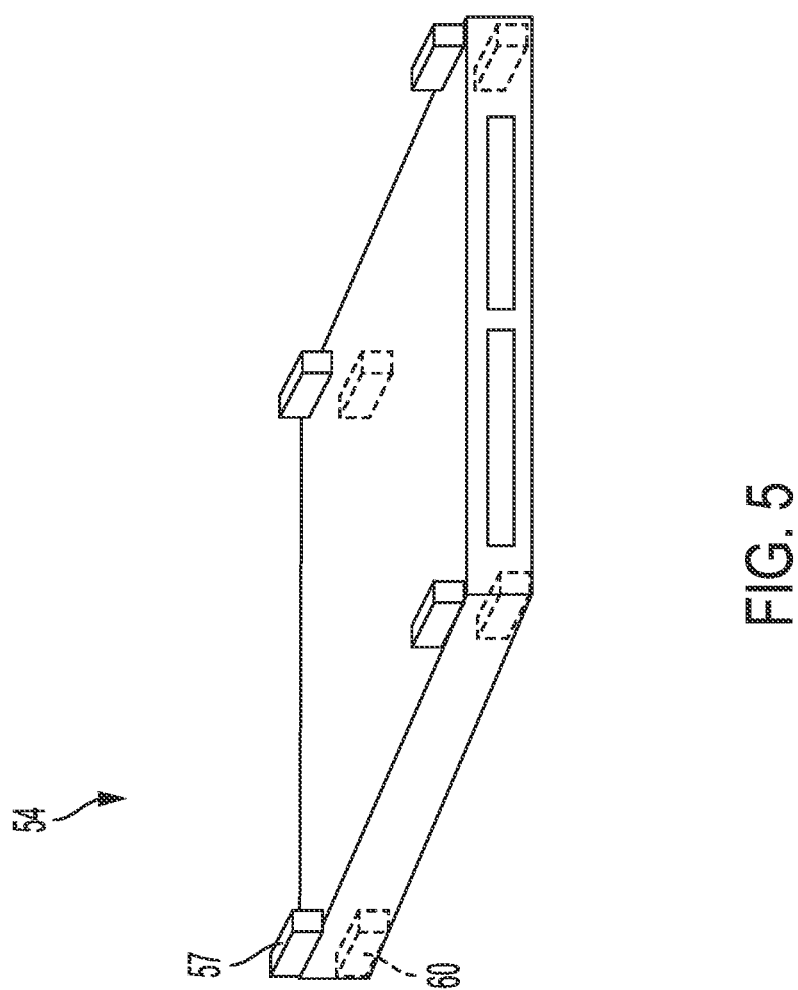
FIG. 5 is a block diagram showing a perspective view of an example element.
Figure 6:
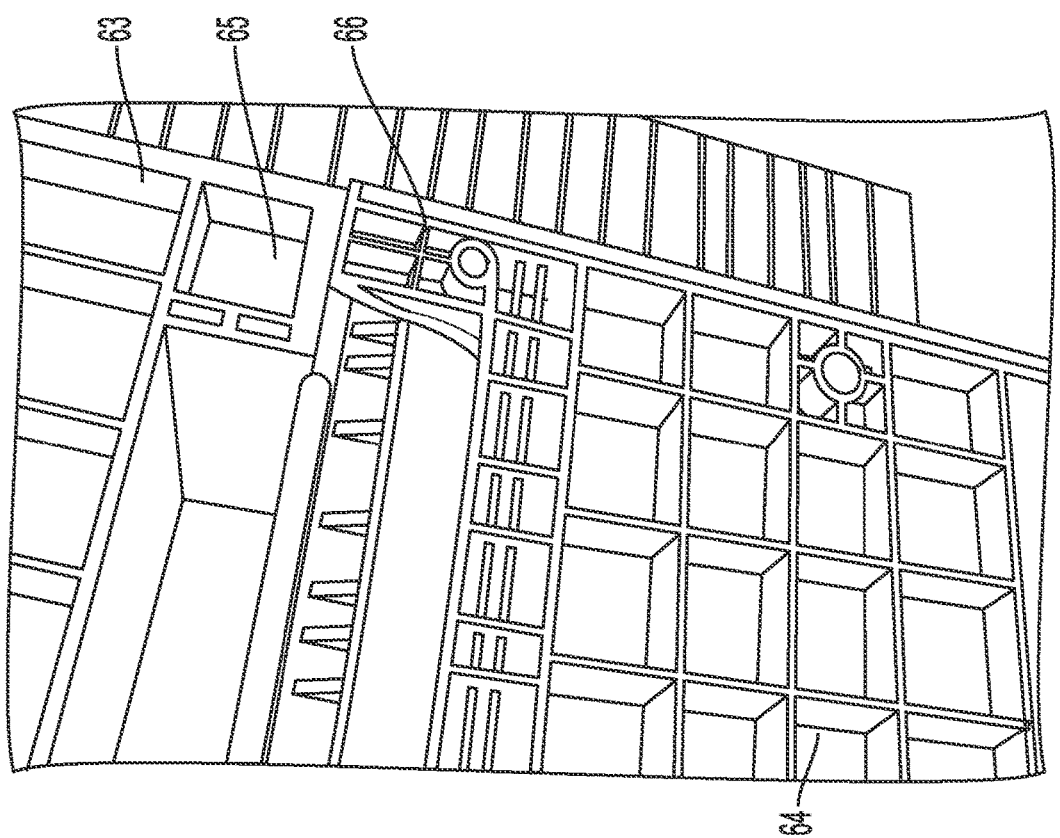
FIG. 6 is a photorealistic diagram showing a close-up perspective view of an example mating between two elements.

In this regard, different types of elements may have different types of interface features. In some examples, interface features include components, protrusions, and/or indentations that enable one element to be stacked stably upon another element. In some elements, such as element 50 of FIG. 4 (a pallet, in this example), there is an interface feature on the top and bottom of each of the four corners of the element. Those on the bottom are shown in dashed lines. In that case, the interface features include a pin 51 on a top of each corner of element 50 and a complementary socket 52 in which a pin from another element fits on the bottom of each corner. Similar pins and sockets may be located elsewhere on the element. Accordingly, to stack multiple such elements, the pins on the top of one element fit into the sockets in the bottom of another element. In another example element 54 of FIG. 5, the interface features includes posts 57 at top four corners of the element 54 and complementary indentations 60 at the bottom four corners of the element. Those on the bottom are shown in dashed lines. Similar indentations and posts may be located elsewhere on the element. Accordingly, to stack multiple such elements, the posts on the top of one element fit into the complementary indentations in the bottom of another element. In another example, the top each corner of an element may lock to the bottom of a corresponding corner of the same type of element. These are referred to as interlocking corners. Accordingly, to stack multiple such elements, the interlocking features of the elements are identified and aligned so that the interlocking features of a top element are in same vertical positions as interlocking features of an element below on which the top element is stacked. In the close-up view of FIG. 6, the interlocking features of two elements 63, 64 contain complementary structures 65, 66 that fit together. In still another example, the interface features include the corners of the element themselves. For example, the top and bottom of an element may be substantially flat. To provide the most stable stack, the edges of the elements should also be aligned in this example.

Figure 7:
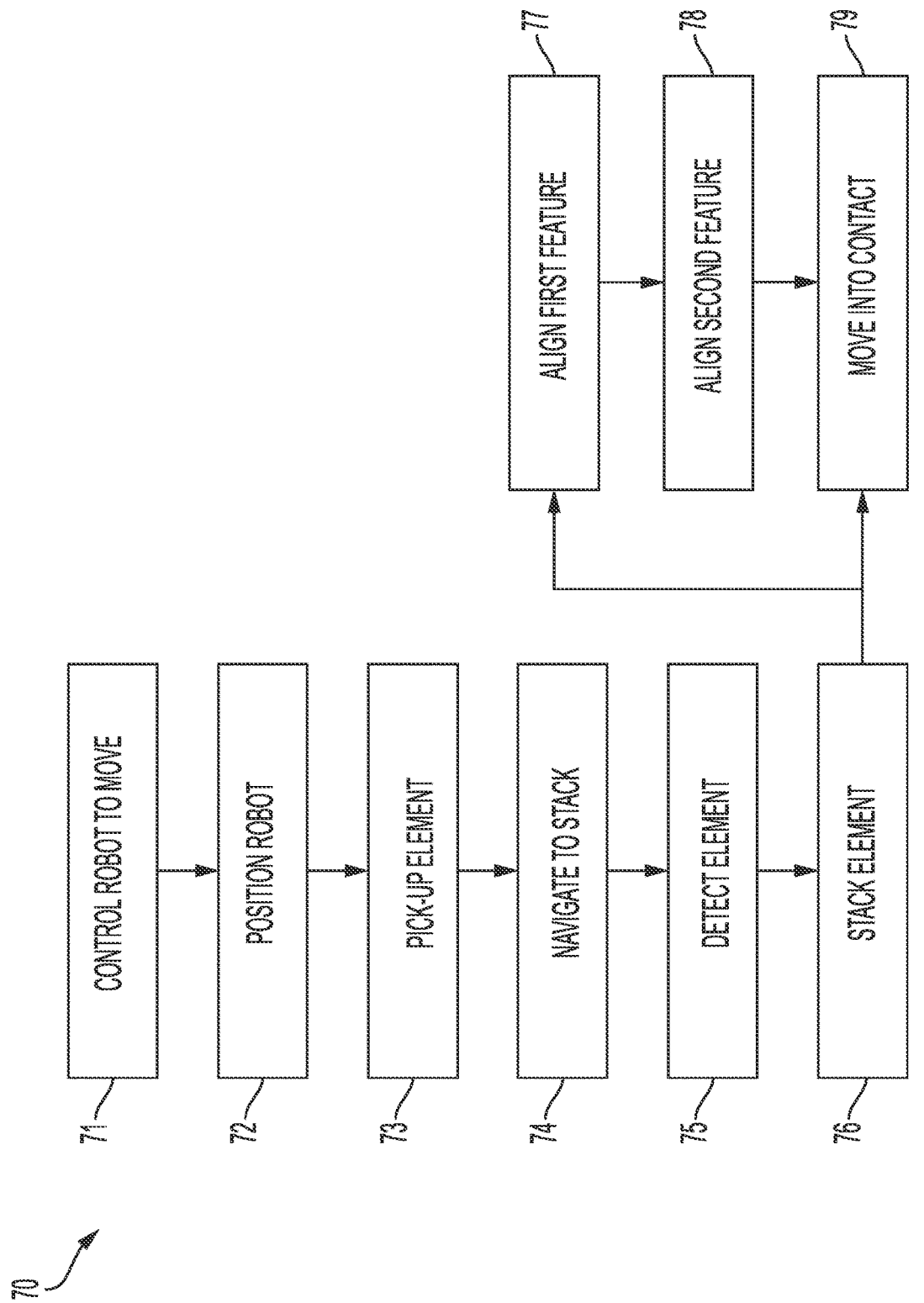
FIG. 7 is a flowchart showing example operations that may be performed, at least in part, by the autonomous vehicle of FIG. 1 to stack elements.

FIG. 7 is a flowchart showing example operations that may be executed by the control system and the robot to stack one element on top of another element. According to process 70, robot 10 is controlled (71) to move to a location of an element to be picked-up. As explained previously, the robot may use a map to navigate a space containing the element and may use a database to identify the element to be picked-up based on its location and/or identifying features, dimensions, indicia, or the like. Once at the location of the element, the robot positions (72) itself so that its end-effector can be inserted into the element. In the case of a pallet, the end effector is inserted into the sockets of the pallet. Using the end-effector, the robot picks-up (73) the element and navigates (74) to near to the location where the element is to be placed—for example, stacked. As explained, the element includes features, such as corners or components thereof, that mate to complementary or compatible features on another element. The robot moves autonomously—for example, based on information in the map, sensors, and signals from a control system—to a location that is proximate to the stack, compatible interlocking device, or rack on which the element is to be placed. There is no human driving the robot through the space.

Figure 8:
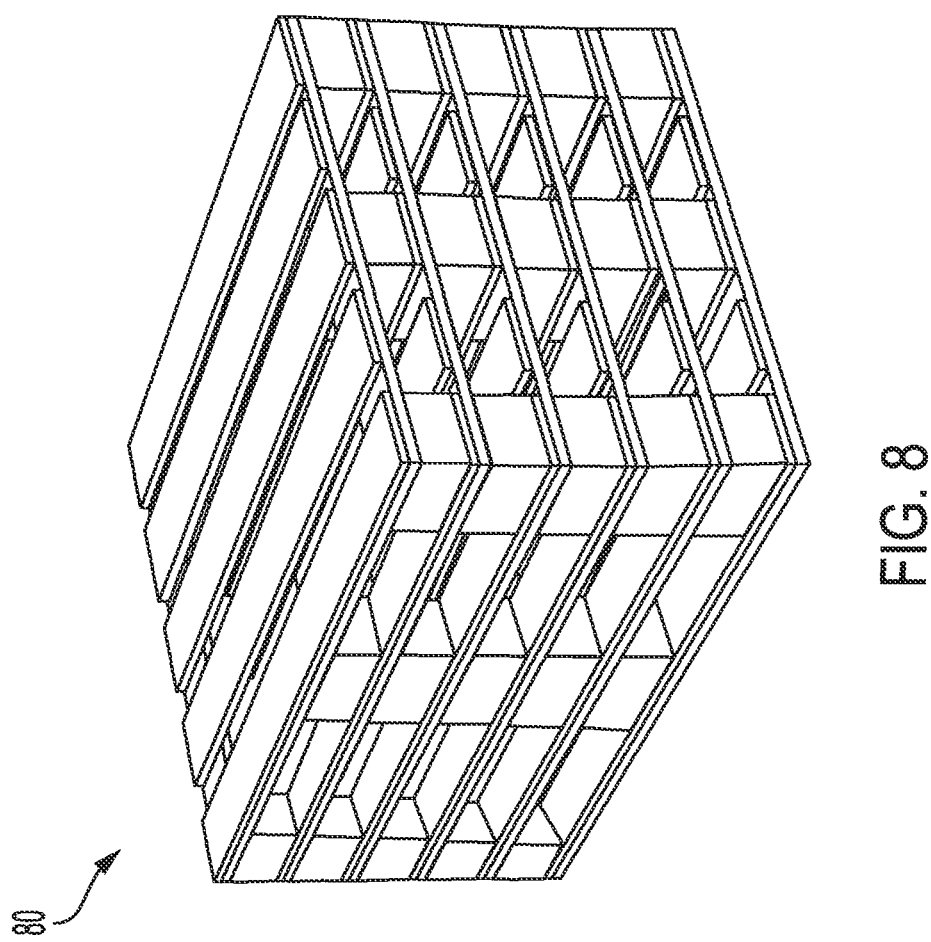
FIG. 8 is a photorealistic diagram showing a perspective view of an example stack of pallets.

Following movement, robot 10 detects (75) an element on which the element that the robot is holding is to be stacked. For example, the detected element may be a compatible interlocking device or a rack. As was the case above, the robot may use a map to navigate to a locate proximate to the detected element, and may use a database to identify a location on which the element the robot is holding is to be stacked based on identifying features, dimensions, indicia, or the like. The robot may also likewise identify the target destination using identifying features, dimensions, indicia, or the like. FIG. 8 shows an example stack 80 of elements and FIG. 9 shows an example rack 81. The element may be placed on a stack of elements on the rack, on a stack of elements on the floor—that is, not on the rack, directly on the rack, or a device having compatible interlocking features, which may not involve stacking per se.

At this point, the on-board control system performs a coordinate system translation between the robot and the environment in order to determine how to manipulate the element. More specifically, the sensors on the robot sense the detected element relative to a robot-based coordinate system. This information is translated to an environmental coordinate system identifying the location on which an element is to be placed. To do this the control system determines a first vector from the robot to the target location and a second vector from a sensor on the robot to the element that the robot is holding. The control system determines a difference between the first vector and the second vector and uses that difference—which reflects the difference in coordinate systems—to control movement of the element relative to the target location.

Referring also to FIGS. 1 and 10 to 15, to stack (76) an element on another element (such as a pallet on stack 81 of FIG. 8), robot 10 controls at least one of its end-effector 16 or its body 12 to move in four, five, or six degrees of freedom to perform operations that include: moving element 83 to align (77) a first corner feature (also referred to as "alignment feature") of element 83 to a first corner feature of element 84, moving element 83 to align a second corner feature (78) of element 83 to a second corner feature of element 84, and moving element 83 into contact (79) with the element 84 so that the first corner features of the two elements mate and so that the second corner features of the two elements mate. As described herein, the corner features may include pins and sockets, posts and indentations, corners themselves, or other mechanical features to mate a top element to a bottom element. As part of the stacking process, sensors on the robot identify location of the corner features and continue to monitor their locations.

Figure 10:
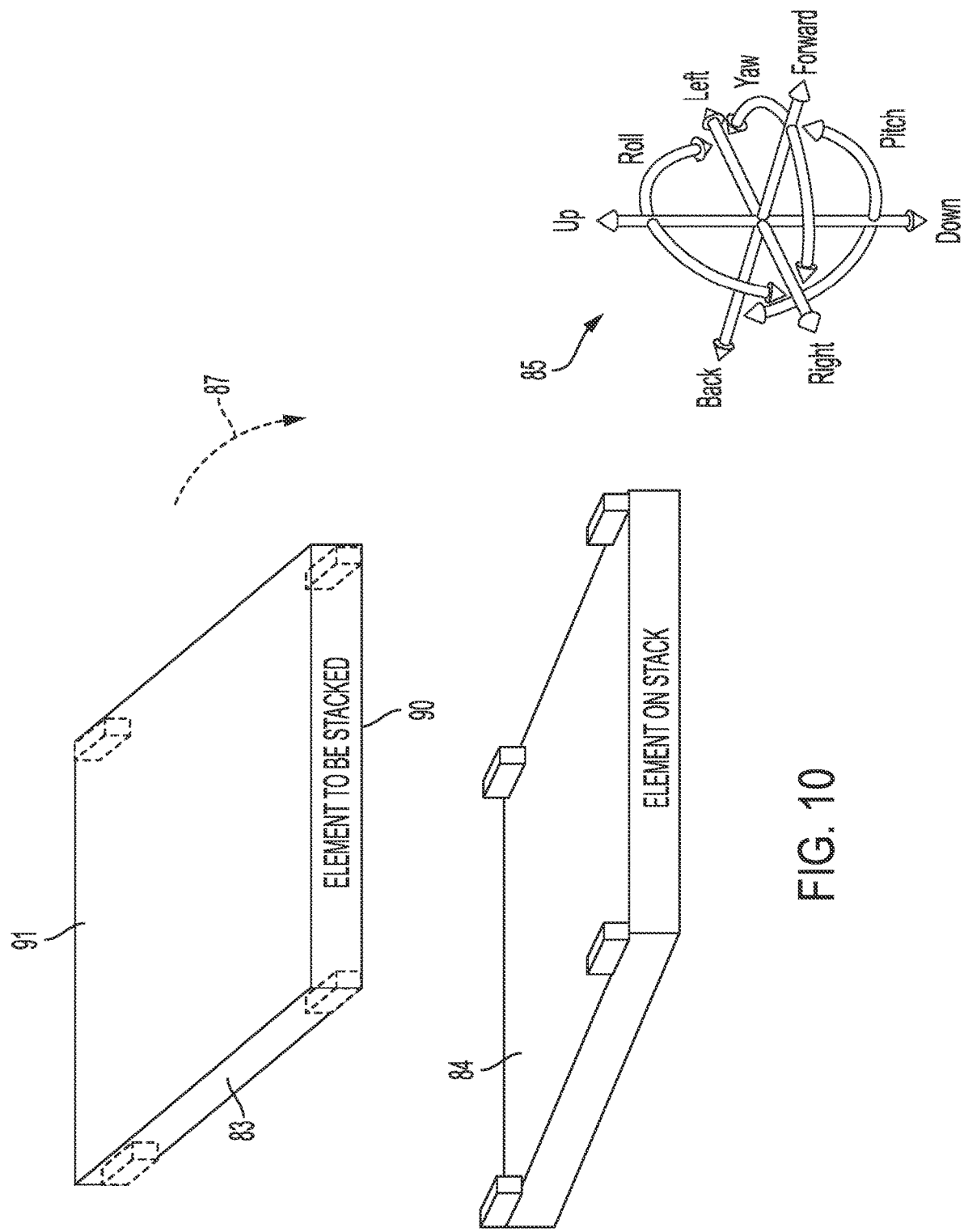

In this regard, FIGS. 10 to 15 show an example stacking operation. A legend 85 showing movement in six degrees of freedom is included in each figure. The robot, however, is omitted from these figures. In FIG. 10, the robot body, end effector, or both are controlled to pitch element forward in the direction of arrow 87 so that the front 90 of element 83 is lower than the back 91 of element 83. In FIG. 11, the robot body, end effector, or both are controlled to roll element 83 left/right in the direction of arrow 88 so that corner 94 of element 83 is at a lowest point for the element in the environmental coordinate space. Sensors on robot 10 locate alignment posts 95 and sockets 96 on elements 83 and 84. Examples of sensors on the robot are described herein. In this example, the posts and the sockets are located on the left and right sides of the elements, for example, in linearly-arranged or diagonally-opposite corners of the element.

Figure 13:
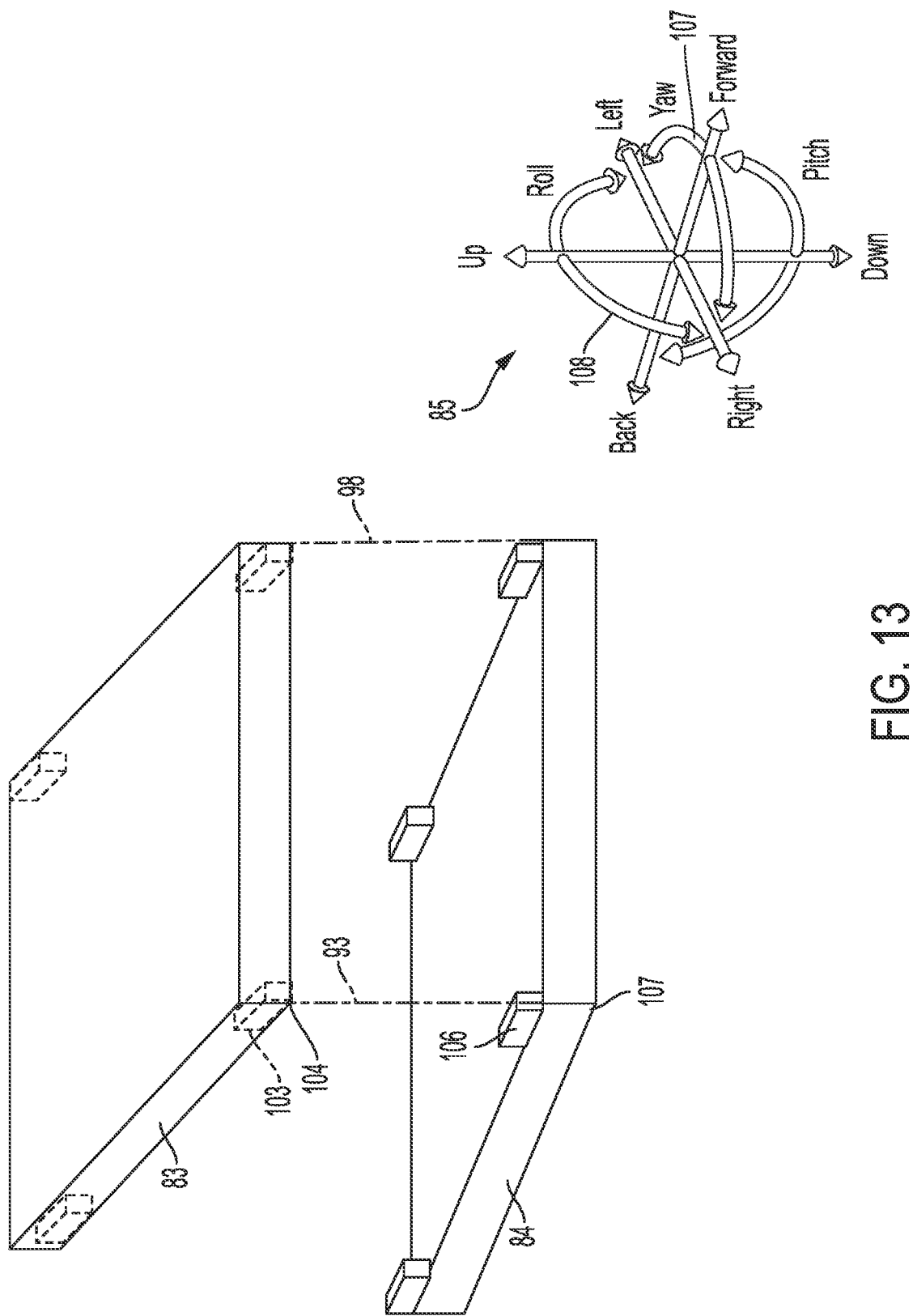
Figure 14:
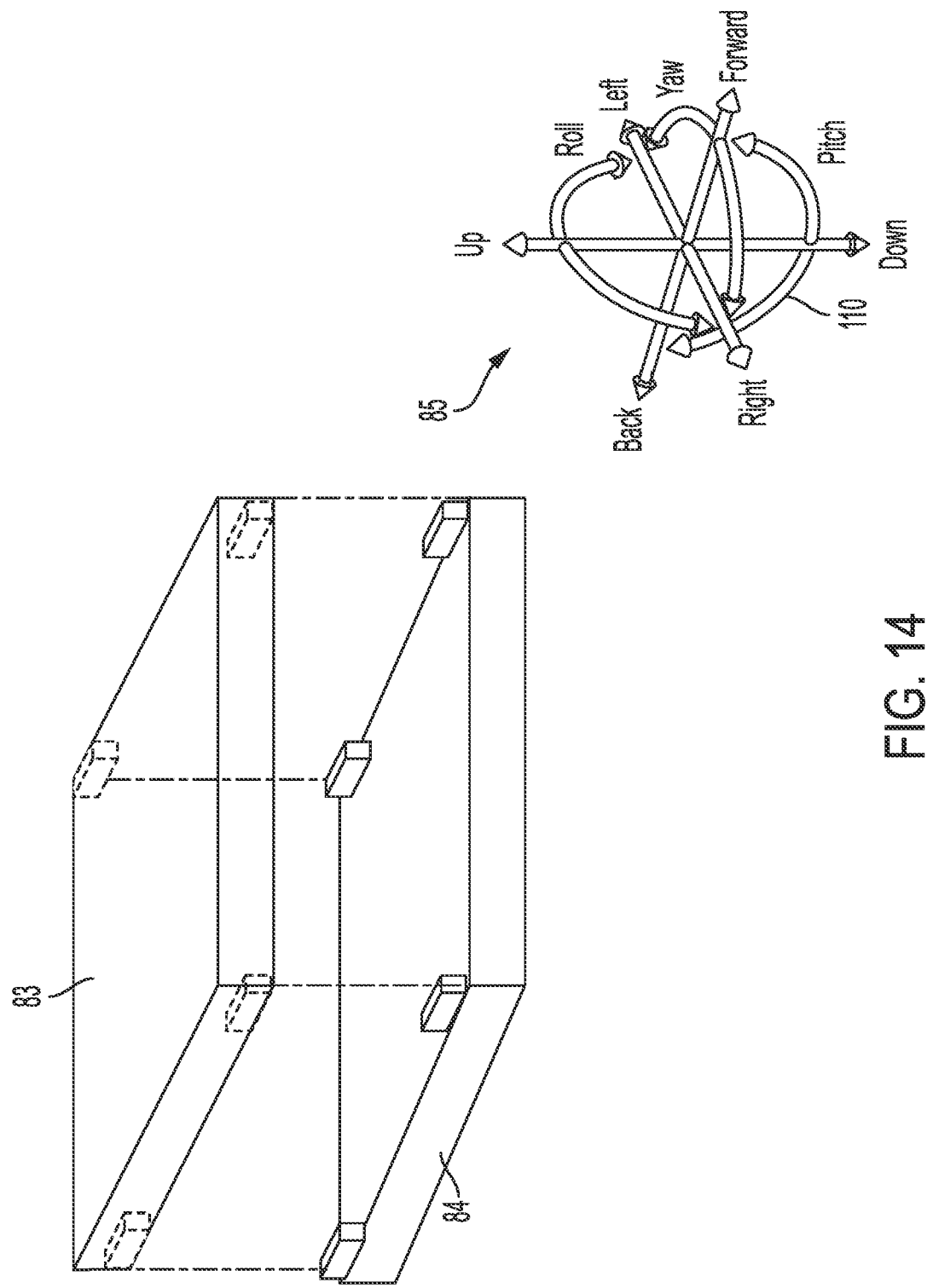
Figure 15:
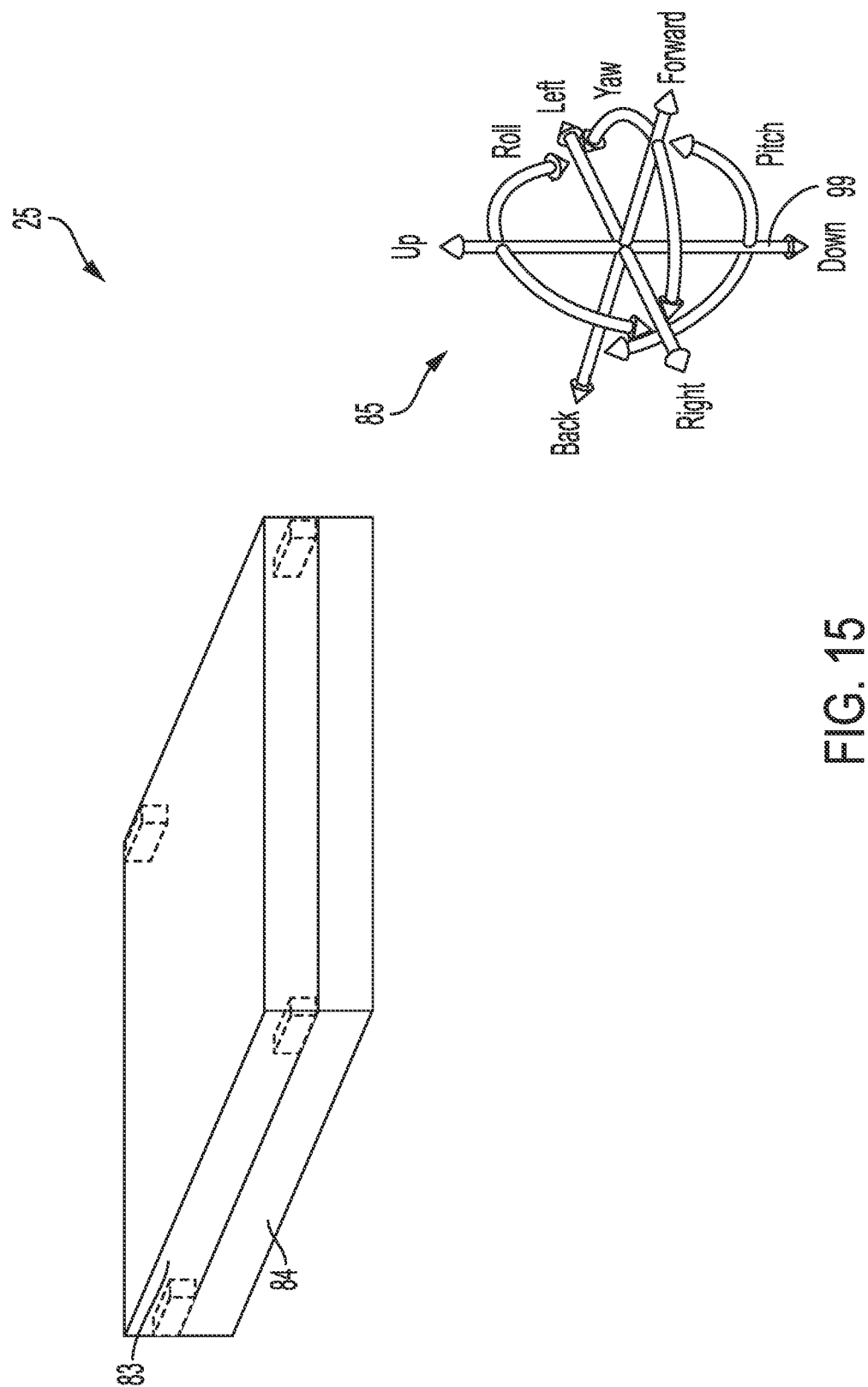

In FIG. 12, the robot body, end effector, or both are controlled to align the Cartesian XY coordinates of socket 100 at corner 94 of element 83 to post 101 at corner 97 of element 84 (the alignment is represented by a dashed line 98) and to perform a gross yaw alignment of element 83 to element 84 during this XY coordinate alignment. At this point, the robot body, end effector, or both may also be controlled to begin to lower element down—in the negative Cartesian Z direction 99—to move socket 100 towards post 101. In FIG. 13, the robot body, end effector, or both are controlled to perform yaw 107 and roll 108 movements to align the Cartesian XY coordinates of socket 103 at corner 104 of element 83 to post 106 of corner 107 of element 84. The alignment is represented by a dashed line 93. In FIG. 14, the robot body, end effector, or both are controlled to perform a pitch movement 110 to align the elements vertically. The alignment is represented by dashed lines (not labeled) at the four corners of the elements. In FIG. 15, the robot body, end effector, or both are controlled to move element 83 downwards so that its sockets mate to the posts of element 84.

In the preceding example, elements 83 and 84 are aligned by using corners 94 and 104 and respective alignment features 100 and 103. These corners may be selected initially using an optimization process based, for example, on their visibility to the sensors and availability. In some implementations, this need not be the case. In some implementations, three or more interlocking features may be aligned as described herein prior to mating. In some implementations, the features used to align the elements may not be located on the element corners. For example, features on opposite sides of the element or on adjacent sides of the element, but not corners, may be used to align the elements. These additional features may also be used to confirm or to augment alignment performed based on corner features, corners, or a combination thereof.

The example robots described herein may be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any mechanical or electrical connection herein may include a direct physical connection or an indirect connection that includes intervening components.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. An autonomous vehicle comprising:
    a body configured for movement along a surface;
    an end-effector to hold a first element having first and second features that mate to complementary third and fourth features on a second element, at least one of the end-effector or the body being controllable to move in at least four degrees of freedom, the at least four degrees of freedom comprising forward/backward, up/down, left/right, and at least one of yaw, pitch, or roll;
    one or more sensors to detect the second element and to obtain information for locating the third and fourth features of the second element; and
    a control system to control at least one of the end-effector or the body to move in the at least four degrees of freedom to stack the first element on top of the second element by performing operations comprising: moving the first element to align the first feature to the third feature, moving the first element to align the second feature to the fourth feature, and moving the first element into contact with the second element so that the first feature mates to the third feature and the second feature mates to the fourth feature.

2. The autonomous vehicle of claim 1, wherein the control system is programmed to determine, based on the information, a first vector from the autonomous vehicle to the second element and a second vector from a sensor among the one or more sensors to the first element, and to control the at least one of the end-effector or the body to move based on a difference between the first vector and the second vector.

3. The autonomous vehicle of claim 1, wherein the control system is configured to cause the first element to move in at least one of forward/backward, up/down, or left/right motions to align the first feature to the third feature; and wherein the control system is configured to cause the first element to move in at least one of pitch, yaw, or roll motions to align the second feature to the fourth feature.

4. The autonomous vehicle of claim 1, wherein the control system is configured to control the at least one of the end-effector or the body to move in at least five degrees of freedom, the at least five degrees of freedom comprising: forward/backward, up/down, left/right, and at least two of yaw, pitch, or roll.

5. The autonomous vehicle of claim 1, wherein the control system is configured to control the at least one of the end-effector or the body to move in six degrees of freedom, the six degrees of freedom comprising: forward/backward, up/down, left/right, pitch, yaw, and roll.

6. The autonomous vehicle of claim 1, wherein the one or more sensors are configured to locate the third and fourth features in three-dimensional (3D) space.

7. The autonomous vehicle of claim 1, wherein the one or more sensors are configured to detect the second element in three-dimensional (3D) space and to obtain 3D coordinates for the second element.

8. The autonomous vehicle of claim 1, wherein the one or more sensors comprise one or more of the following: a light detection and ranging (LIDAR) sensor, a time-of-flight (TOF) sensor, a radar sensor, a sonar sensor, a two-dimensional camera sensor, or a three-dimensional camera sensor.

9. The autonomous vehicle of claim 1, wherein the control system comprises one or more processing devices that are resident on the autonomous vehicle and that are configured execute software to perform the operations independent of data input from an external source.

10. The autonomous vehicle of claim 1, wherein the control system comprises one or more processing devices that are resident on the autonomous vehicle and that are configured to execute software to perform the operations based, at least in part, on data input from a fleet system that is external to the autonomous vehicle.

11. The autonomous vehicle of claim 1, wherein the control system comprises one or more processing devices that are resident on the autonomous vehicle, the one or more processing devices being programmed to receive information from a fleet system that is external to the autonomous vehicle, the one or more processing devices being programmed to control movement of the body toward the second element based on the information.

12. The autonomous vehicle of claim 1, wherein the control system comprises one or more processing devices that are resident on the autonomous vehicle, the one or more processing devices being programmed to receive information from a fleet system that is external to the autonomous vehicle, the one or more processing devices being programmed to identify a type of the second element based on the information.

13. The autonomous vehicle of claim 1, further comprising:
    computer memory storing a database containing data identifying different types of elements and attributes of the different types of elements;
    wherein the control system comprises one or more processing devices that are resident on the autonomous vehicle, the one or more processing devices being programmed to obtain data from the database to identify a type of the second element and attributes of the second element, the attributes relating to the third and fourth features of the second element.

14. The autonomous vehicle of claim 1, wherein the control system comprises one or more processing devices that are resident on the autonomous vehicle, the one or more processing devices being programmed to receive information from a fleet system that is external to the autonomous vehicle, the one or more processing devices being programmed to move to a location proximate to the second element based on the information and, after reaching the location, to control at least one of the end-effector or the body to move in the at least four degrees of freedom to stack the first element on top of the second element independent of input from the fleet system.

15. The autonomous vehicle of claim 14, wherein the information comprises a map of an area in which the second element is located.

16. The autonomous vehicle of claim 1, wherein the first element and the second element each comprise pallets.

17. The autonomous vehicle of claim 1, wherein the end-effector is configured to move in the at least four degrees of freedom; and
wherein the control system is configured to control the end-effector to move in the at least four degrees of freedom to stack the first element on top of the second element.

18. The autonomous vehicle of claim 1, wherein the end-effector is configured to move in at least five degrees of freedom, the at least five degrees of freedom comprising: forward/backward, up/down, left/right and at least one of pitch, yaw or roll; and
wherein the control system is configured to control the end-effector to move in the at least five degrees of freedom to stack the first element on top of the second element.

19. The autonomous vehicle of claim 1, wherein the end-effector is configured to move in six degrees of freedom, the six degrees of freedom comprising: forward/backward, up/down, left/right, pitch, yaw, and roll; and
wherein the control system is configured to control the end-effector to move in the six degrees of freedom to stack the first element on top of the second element.

20. The autonomous vehicle of claim 1, wherein the end-effector comprises tines to hold the first element, the tines comprising a first tine and a second tine, the first tine being configured to move independently of the second tine in at least one degree of freedom, and the second tine being configured to move independently of the first tine in the at least one degree of freedom.

21. The autonomous vehicle of claim 1, wherein at least one of the third feature or the fourth feature on the second element is in a corner of the second element.

22. A method performed by an autonomous vehicle, comprising:
using an end-effector connected to a body of the autonomous vehicle to pick-up a first element having first and second features that mate to complementary third and fourth features on a second element;
moving the autonomous vehicle holding the first element along a surface toward a location of the second element;
detecting the second element, where detecting comprises locating the third and fourth features of the second element; and
controlling at least one of the end-effector or the body to move in at least four degrees of freedom to stack the first element on top of the second element by performing operations comprising: moving the first element to align the first feature to the third feature, moving the first element to align the second feature to the fourth feature, and moving the first element into contact with the second element so that the first feature mates to the third feature and the second features mates to the fourth feature;
wherein the at least four degrees of freedom comprise forward/backward, up/down, left/right, and at least one of yaw, pitch, or roll.

* * * * *